United States Patent [19]

Concin

[11] Patent Number: 5,114,583

[45] Date of Patent: May 19, 1992

[54] FILTER UNIT WITH HIGH VOLUMETRIC EFFICIENCY AND REDUCED FILTERING SURFACE

[76] Inventor: Antonio Concin, via Martiri di Belfiore 2, 20052 Monza, Milano

[21] Appl. No.: 616,203

[22] Filed: Nov. 20, 1990

[30] Foreign Application Priority Data

Nov. 29, 1989 [IT] Italy .................. 22169/89[U]

[51] Int. Cl.⁵ ............................................ B01D 29/52
[52] U.S. Cl. ..................................... 210/346; 55/300;
55/304; 55/341.3; 55/341.6; 55/484; 210/323.2;
210/334; 210/340; 210/341; 210/346; 210/388;
210/422; 210/428; 210/486
[58] Field of Search ............... 55/300, 302, 304, 341.1,
55/341.3, 341.6, DIG. 3, 484; 210/332, 334,
346, 384, 388, 422, 428, 486, 488, 323.2, 340,
341

[56] References Cited

U.S. PATENT DOCUMENTS

| | | | |
|---|---|---|---|
| 2,014,298 | 9/1935 | Schneible | 55/304 |
| 3,964,883 | 6/1976 | Nakao | 55/304 |
| 4,502,874 | 3/1985 | Levie et al. | 55/283 |
| 4,597,784 | 7/1986 | Albrecht et al. | 55/378 |
| 4,919,801 | 4/1990 | Hobson, Jr. | 210/332 |

Primary Examiner—W. Gary Jones
Assistant Examiner—Sun Uk Kim
Attorney, Agent, or Firm—Ladas & Parry

[57] ABSTRACT

The filter unit is of the type comprising a casing (2), filter tubes (5) associated with a filtering surface (6), shaker means (7) for the filtering surface (6), a suction pipe (10) associated with the casing and a suction pipe (11) associated with one or more turbines and characterized in that the casing (2) comprises above the filtering surface (6) at least two separate chambers (13,13') each independently connected to the suction pipe (11) associated with one or more turbines.

5 Claims, 1 Drawing Sheet

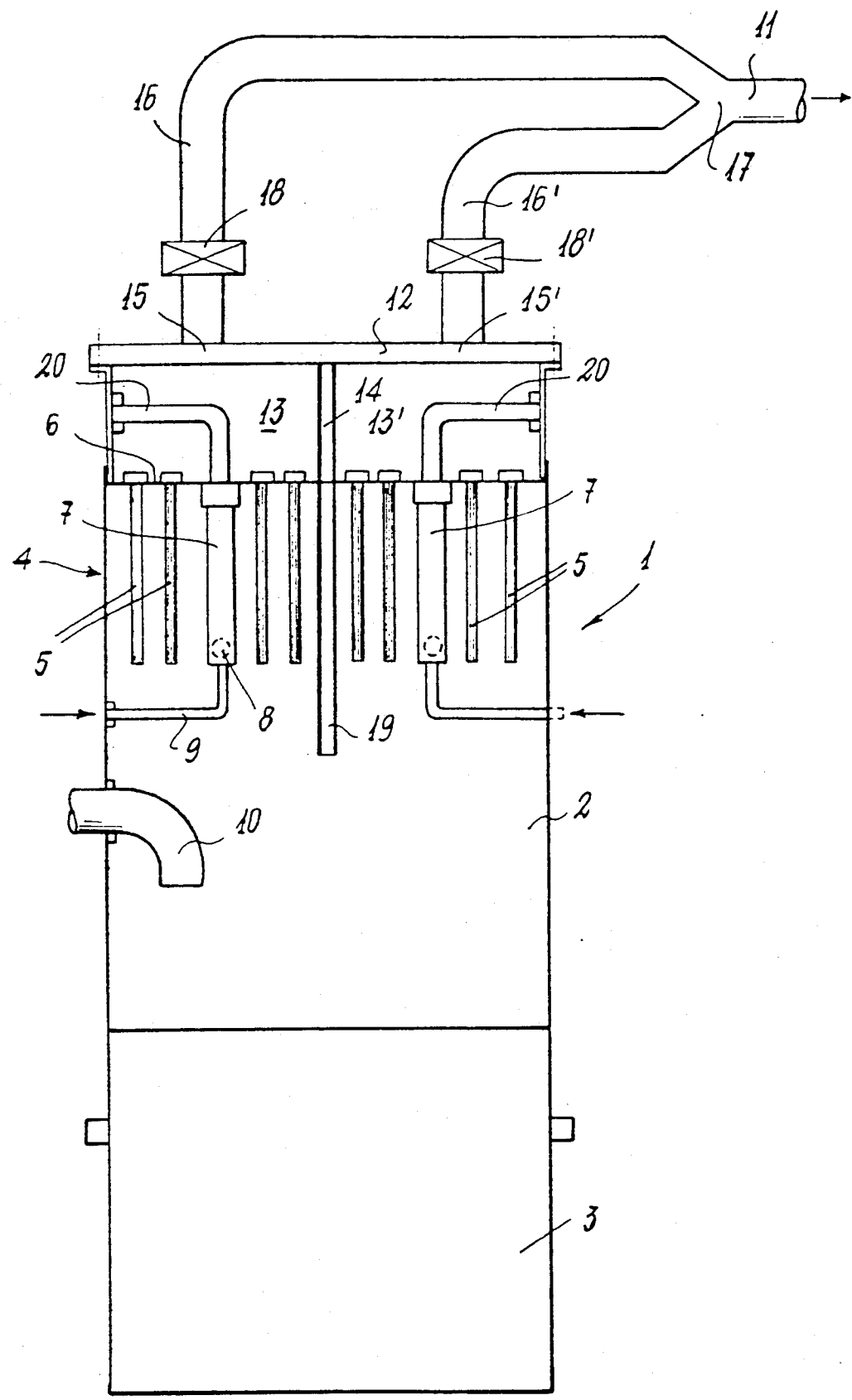

FILTER UNIT WITH HIGH VOLUMETRIC EFFICIENCY AND REDUCED FILTERING SURFACE

This invention relates to a filter unit with high volumetric efficiency and reduced filtering surface, the component parts of which are combined and formed in such a manner as to provide it with particularly useful characteristics.

The invention finds particular application in working environments using dust-generating machines, such as orbital tools used for sanding filler material in vehicle body shops before painting. As is well known to the expert of the art, current high-efficiency filter units require large-area filtering surfaces, resulting in various drawbacks including the fact that the cleaning means necessarily require a certain power, a large installation space is required which must not however result in disturbance to the positioning of the various operating machines, a high cost is involved, etc.

An object of the present invention is to provide a filter unit of the aforesaid type which totally overcomes the stated drawbacks of conventional filter units.

This and further objects of the invention will be apparent to the expert of the art on reading the description given thereinafter.

The filter unit comprises a casing, a plurality of filter tubes mounted in a filtering surface, a shaker for shaking the filtering surface, an inlet pipe in fluid communication with the casing on the upstream side of the filtering surface, an outlet pipe in fluid communication with the casing on the downstream side of the filtering surface, and at least two separate chambers each independently connectable to the outlet pipe.

The invention is illustrated schematically by way of example in the single accompanying FIGURE.

With reference to said FIGURE the filter unit, indicated overall by 1, is of the type comprising a casing 2 of circular cross-section associated with a dust container 3, said casing housing a filter unit indicated overall by 4 and conventionally consisting of a plurality of vertically arranged filter tubes 5 suspended from a surface 6 carrying shaker means 7 of the ball type. In the FIGURE the shaker means 7 each comprise a ball 8 caused to move energetically by compressed air fed through the pipe 9.

An inlet pipe 10 is provided in the lateral surface of the lower part of the casing 2. Draw-off from the casing 2 is provided by a conventional turbine (not shown) in fluid communication with an outlet pipe 11.

According to the invention, to satisfy the requirement of providing a high efficiency filter unit of reduced filtering surface, the interior of the casing 2 between the filtering surface 6 and the upper cover 12 is in the form of two separate compartments 13, 13' separated by a sealing diaphragm 14, each chamber comprising an outlet aperture 15, 15' to which there is connected a tube branch 16, 16' which at 17 meets the outlet pipe 11, the cross-sections of the branches 16 and 16' being equal to the cross-sections of the pipes 11 and 10. The branches 16 and 16' are each provided with their own valve 18, 18' and the casing 2 comprises a vertical dividing wall 19 interposed between the filters 5 in a position corresponding to the diaphragm 14.

The shaker means 7 conventionally comprise discharge pipes 20 to the outside.

The use of sealed chambers 13 and 13', the dividing wall 19 and the separate branches 16, 16' independently closable by the valves 18 and 18' enables the efficiency of the filter unit 1 to be raised while maintaining very small filtering surfaces.

In this respect during operation, and assuming the valve 18' to be closed, as the cross-sections of the pipes 11 and 10 are equal to each other and to the cross-section of the branches 16 and 16', the use of the described structure means that the passage cross-section of that surface 6 relative to the chamber 13 and be kept equal to the cross-section of the remaining pipes as the filtering surface relative to said chamber 13 is kept permanently clean because of the facility for alternating draw-off via the chamber 13 or via the chamber 13' as required, by simply closing one or other of the branches 16, 16'. The cleaning of the one or the other chamber is effected by operating the shaker means 7 during the exclusion of the one or the other chamber.

I claim:

1. A filter unit comprising:
   a casing
   a filtering surface extending across the interior of said casing.
   a plurality of filter tubes mounted in said filtering surface;
   shaker means for shaking said filtering surface;
   an inlet pipe in fluid communication with said casing on the upstream side of said filtering surface;
   an outlet pipe in fluid communication with said casing on the downstream side of said filtering surface; and
   at least two separate chambers each independently connectable to said outlet pipe, and wherein said casing comprises:
   at least one sealing partition extending from the interior of said casing to the downstream side of said filtering surface, thereby defining said separate chambers downstream of said filtering surface; and
   a number of dividing walls, equal in number to a number of said sealing partitions said dividing walls vertically arranged and suspended from the upstream side of said filtering surface.

2. A filter unit as claimed in claim 1, wherein each said chamber is connectable to said outlet pipe by a branch, each branch comprising its own shutoff valve.

3. A filter unit as claimed in claim 2, wherein said branches are connected to said outlet pipe by a Y-shaped connection piece.

4. A filter unit as claimed in claim 3, wherein the cross-sectional area of each of said inlet and outlet pipes and each of said branches are equal, the cross-sectional area of said filtering surface in each chamber being equal to or greater than the cross-sectional area of each of said pipes and each of said branches.

5. A filter unit as claimed in claim 2, wherein the cross-sectional area of each of said inlet and outlet pipes and each of said branches are equal, the cross-sectional area of said filtering surface in each chamber being equal to or greater than the cross-sectional area of each of said pipes and each of said branches.

* * * * *